United States Patent
Troller et al.

(10) Patent No.: US 7,771,083 B2
(45) Date of Patent: Aug. 10, 2010

(54) RETROFIT WITH A FLUORESCENT BASED LIGHTING ASSEMBLY

(75) Inventors: John F. Troller, Lake Forest, IL (US); Jonathan M. Guerster, Charlestown, MA (US); Robert J. Kirby, Somerville, MA (US); Mark Wedell, Wilmington, NC (US)

(73) Assignee: Groom Energy Solutions, Salem, MA (US)

( * ) Notice: Subject to any disclaimer, the term of this patent is extended or adjusted under 35 U.S.C. 154(b) by 458 days.

(21) Appl. No.: 11/873,264

(22) Filed: Oct. 16, 2007

(65) Prior Publication Data

US 2009/0021940 A1    Jan. 22, 2009

Related U.S. Application Data

(60) Provisional application No. 60/877,033, filed on Dec. 26, 2006.

(51) Int. Cl.
*F21V 23/02* (2006.01)
(52) U.S. Cl. .............. 362/260; 362/364; 362/365; 362/366; 362/368; 362/370; 362/217.01; 362/217.1; 362/217.12; 362/217.14; 362/217.16
(58) Field of Classification Search .......... 362/364, 362/365, 366, 368, 370, 371, 217.01, 217.1, 362/217.12, 217.14, 217.16
See application file for complete search history.

(56) References Cited

U.S. PATENT DOCUMENTS

| | | | | |
|---|---|---|---|---|
| 5,597,233 A | * | 1/1997 | Lau | 362/294 |
| 5,887,968 A | * | 3/1999 | Logan | 362/241 |
| 6,109,766 A | * | 8/2000 | Baliozian | 362/287 |
| 6,146,170 A | * | 11/2000 | Fumin | 439/236 |
| 6,575,594 B1 | * | 6/2003 | Jafari | 362/235 |
| 7,478,931 B2 | * | 1/2009 | Miletich et al. | 362/364 |
| 2005/0281024 A1 | * | 12/2005 | Mayfield et al. | 362/221 |
| 2006/0256566 A1 | * | 11/2006 | Beghelli | 362/365 |
| 2007/0177390 A1 | * | 8/2007 | Evans | 362/365 |

OTHER PUBLICATIONS

Cooper/McGraw-Edison; PSC Parking Garage Luminaire.
Kim Lighting, PGL4 PGL1HP, Parking Garage Luminaires, Copyright 2007 Hubbell Lighting, Inc. 5502607022 Version 2.0 (Jan. 2007).
Kim Lighting, Wall Forms®, Wall Mounted Luminaires, Copyright 2004 Kim Lighting, Inc. 5504304012 Version 1.0 (Aug. 2006).
Kim Lighting, PGL Omni-System, PGL2/3, Copyright 2005 Kim Lighting, Inc., 5502805094 Version Apr. 2005.
RAB Lighting, Inc., VAN5F52QT; www.rabweb.com © 2008; 1 page.
RAB Lighting, Inc., VAN5F64QT/PC; www.rabweb.com © 2008; 1 page.
RAB Lighting, Inc., VAN5F84QT; www.rabweb.com © 2008; 1 page.

(Continued)

*Primary Examiner*—Sandra L O'Shea
*Assistant Examiner*—Jessica L McMillan
(74) *Attorney, Agent, or Firm*—Occhiuti Rohlicek & Tsao LLP

(57) ABSTRACT

Retrofitting lighting fixtures (e.g., HID based lighting fixtures) using a pin mounted PL style fluorescent based energy efficient light assembly and methods of installing retrofitting lighting fixtures are disclosed.

16 Claims, 12 Drawing Sheets

OTHER PUBLICATIONS

RAB Lighting, Inc., VAN5F84QTW/PC; www.rabweb.com © 2008; 1 page.
RAB Lighting, Inc., VAN5F96QTW; www.rabweb.com © 2008; 1 page.
RAB Lighting, Inc., VAN5F64QTW; www.rabweb.com © 2008; 1 page.
RAB Lighting, Inc., VAN5F84QT/PC; www.rabweb.com © 2008; 1 page.
RAB Lighting, Inc., VAN5F96QT; www.rabweb.com © 2008; 1 page.
RAB Lighting, Inc., VAN5F96QTW/PC; www.rabweb.com © 2008; 1 page.
RAB Lighting, Inc., VAN5F52QTW; www.rabweb.com © 2008; 1 page.
RAB Lighting, Inc., VAN5F64QTW/PC; www.rabweb.com © 2008; 1 page.
RAB Lighting, Inc., VAN5F84QTW; www.rabweb.com © 2008; 1 page.
RAB Lighting, Inc., VAN5F96QT/PC; www.rabweb.com © 2008; 1 page.
RAB Lighting, Inc., VAN5F64QT; www.rabweb.com © 2008; 1 page.

* cited by examiner

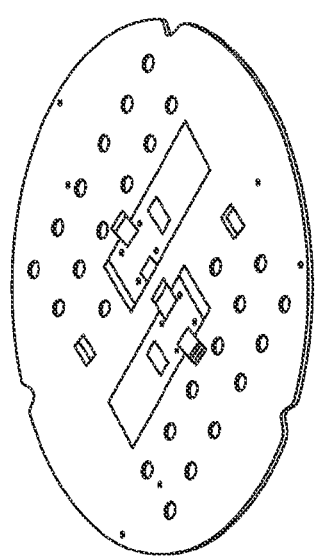
FIG. 4E
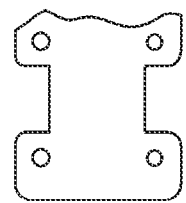
FIG. 4D
FIG. 4C
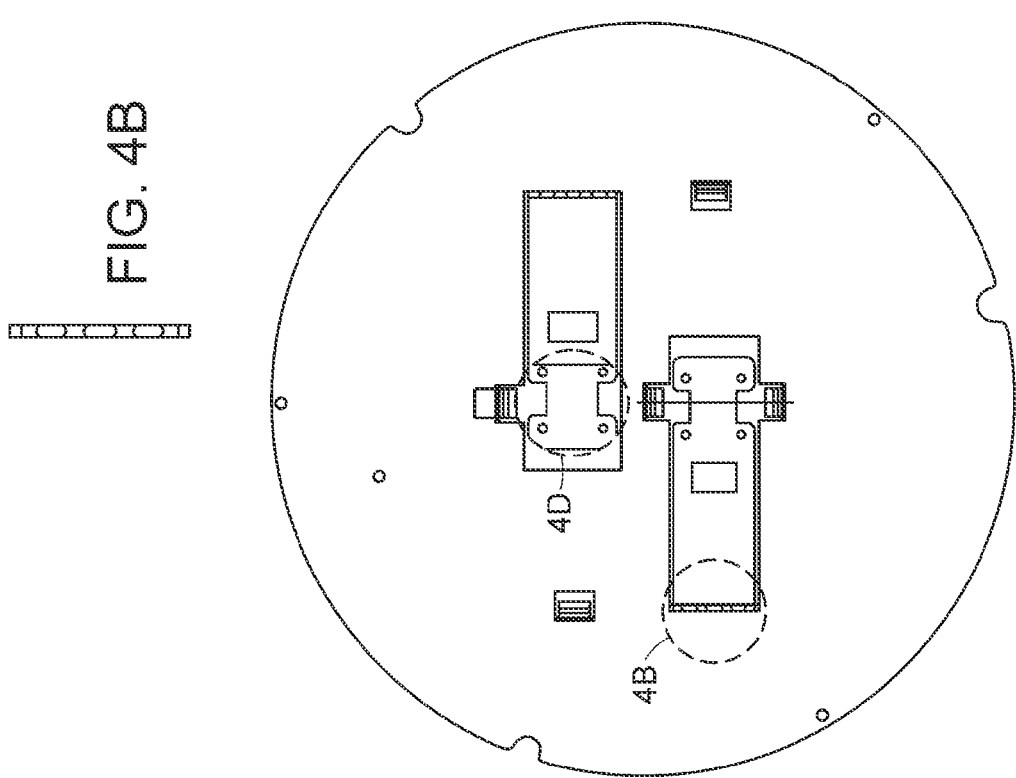
FIG. 4B
FIG. 4A

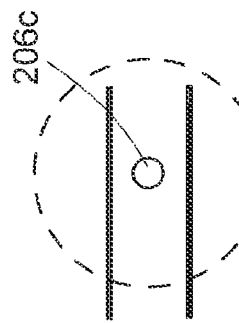
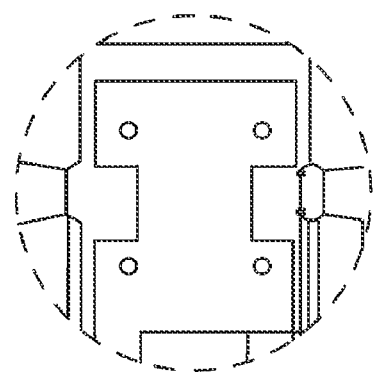
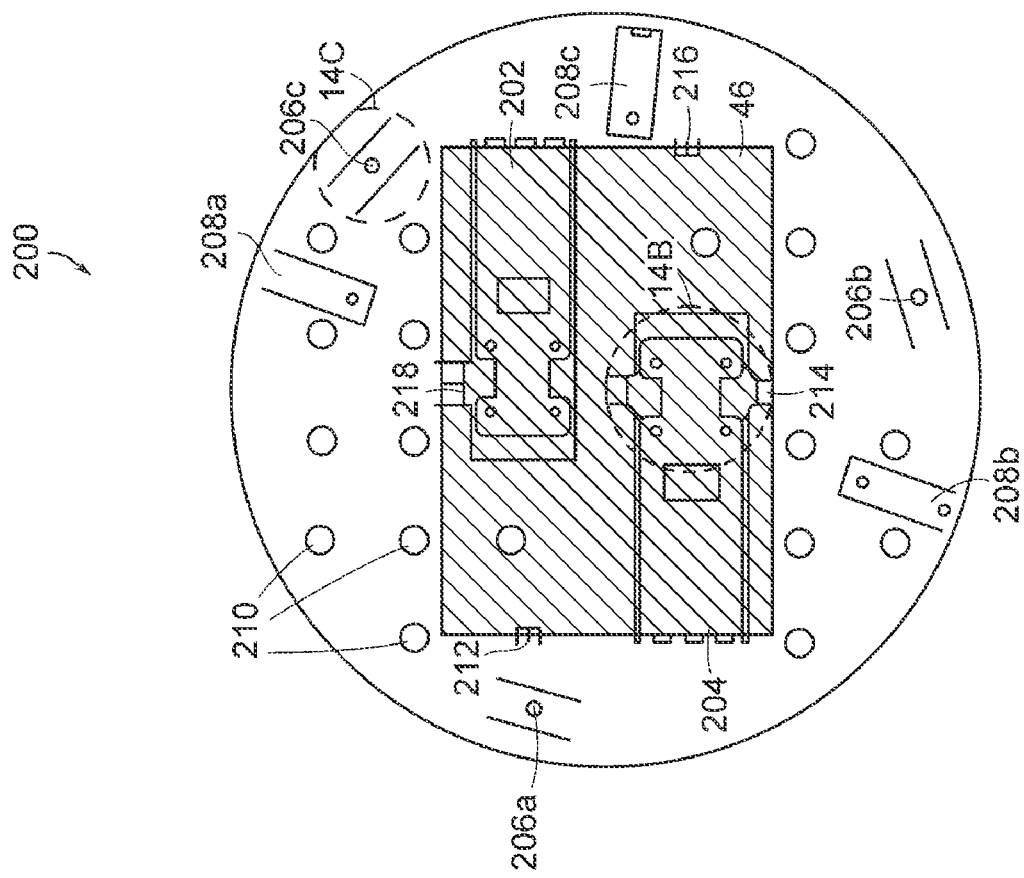

RETROFIT WITH A FLUORESCENT BASED LIGHTING ASSEMBLY

CROSS-REFERENCE TO RELATED APPLICATIONS

This application is a continuation-in-part of U.S. application Ser. No. 60/877,033, filed Dec. 26, 2006, and titled "Fluorescent-based Parking Garage Lighting Retrofit Kit," which is incorporated in its entirety by reference.

FIELD OF INVENTION

The present description relates to retrofits of existing high intensity discharge based lighting fixtures using fluorescent based lighting assemblies.

BACKGROUND

As energy costs have risen, some commercial, industrial and municipal customers are removing existing older lighting fixtures (e.g., high intensity discharge (HID) and/or older T12 fluorescent lighting fixtures) and replacing them with newer, more energy efficient lighting fixtures. These more energy efficient lighting fixtures can be based on multiple lamp types including high intensity linear fluorescent (HIF), screw-in compact fluorescent (CFL), pin mounted photoluminescence fluorescent (PL), induction lamps (IL), and/or light emitting diodes (LED).

While the cost of installing entirely new fixtures using such energy efficient lamps can be returned over time based on the energy savings, the process can be time consuming, includes the purchase of a completely new fixture and hence delivers a proportionally lower economic return. In addition, newer highly efficient IL and LED based fixtures have extremely high initial capital costs.

Retrofitting an existing HID fixture using a screw-in CFL style lamp(s) without a light reflector has been performed, but the light output performance associated with the screw-in CFL type of lamp has delivered poor performance versus the pre-existing HID style lamps.

Retrofitting an existing HID fixture with a higher performance PL lamp and ballast without a light reflector has been performed, but the light output performance associated with this retrofit has delivered poor performance versus the pre-existing HID style lamps.

Retrofitting an existing HID fixture with PL lamp(s) and an optically efficient light reflector optimized for the PL lamp and a backing plate designed for easy mounting enables the best balance of sufficient light output with high energy savings and a low total cost of installation.

SUMMARY

This disclosure relates to retrofitting lighting fixtures (e.g., HID based lighting fixtures) using a PL based energy efficient light assembly.

In some aspects, a lighting retro-fit system can be used for mounting one or more PL lamps within an existing external housing of a light fixture. The existing external housing can include a light reflector mount. The retro-fit system can include a light reflector for reflecting light from a PL lamp(s) in a direction away from the reflector. The retro-fit system can also include a one piece adapter backing plate. The one piece adapter backing plate can include one or more arms configured to support the one or more PL lamps and one or more openings, screw holes or tabs configured to enable attachment of the one piece adapter plate to a plurality of fixture designs. The adapter plate can be configured to surround a periphery of the light reflector and can be configured to mount the light reflector within the existing external housing of the fixture. The retro-fit system can also include a mechanical connector configured to attach the light reflector to a reflector mount on the one piece adapter. The retro-fit system can also include at least one lamp connection configured to receive the lamp and configured to be attached one of the one or more arms. The adapter plate can include a plurality of openings to accommodate wiring from the lamps to the ballast, mounted inside of the existing fixture housing.

Embodiments can include one or more of the following.

The adapter can include a plurality of adapters. Each of the adapters can be configured to receive the light reflector along an inner periphery of the adapter and have a different outer periphery for mounting to a different external fixture housing. The existing fixture can also include at least one HID lamp. The HID lamp and existing reflector can be replaced with a retro-fit system including PL lamp(s) in combination with an optically efficient light reflector optimized for the PL lamps (s). The retro-fit system can also include a ballast. The light reflector can have a conical shape.

In some aspects, a method for retrofitting a lighting system can include removing a light assembly having a first HID lamp and a first light reflector from an external fixture housing. The method can also include selecting one of a plurality of backing plate adapters that is associated with the external housing. The method can also include attaching the selected one of the backing plate adapters to a periphery of an existing fixture housing or backing plate. The method can also include attaching a second PL lamp to the backing plate and using the same light reflector for reflecting light from the second lamp in a direction away from the reflector. The method can also include attaching the light reflector to a reflector mount on the backing plate.

Embodiments can include one or more of the following.

The method can also include bending at least one light assembly support arm included in the backing plate to a position about perpendicular to the backing plate. Removing the light assembly having the first lamp and the light reflector from the external housing and can include removing a fixture diffuser lens, removing the first lamp, removing a lamp socket, and optionally removing a ballast. Removing the light assembly having the first lamp and the first light reflector from the external housing can further include optionally removing a base plate, reflector, starter, and a restrike lamp. The method can also include inserting fish paper into a slot area.

In some aspects, a fluorescent lighting retro-fit system can be configured for mounting a PL lamp(s) within one of a plurality of external housings of a lamp assembly that includes a reflector mount. The retro-fit system can include a light reflector for reflecting light from at least one fluorescent lamp in a direction away from the reflector. The light reflector can include a mechanical connector for attaching the fluorescent light reflector to the reflector mount. at least one lamp connection configured to receive the fluorescent lamp, and a plurality of adapters, each configured to surround the periphery of the light reflector and each configured to mount the light reflector within a corresponding one of the plurality of external housings.

The lighting assembly enables the retrofitting of an existing HID based fixture with a set of components that optimize light output while reducing the energy consumed by the lamps during the product's useful life.

In some embodiments, retrofitting an existing HID fixture with a CFL lamp in combination with an optically efficient light reflector optimized for the CFL lamp increases the light output performance significantly when compared to retrofitting with only a CFL lamp and no light reflector, hence providing higher energy savings.

Other features and advantages of the invention are apparent from the following description, and from the claims.

DESCRIPTION OF DRAWINGS

FIG. 4 shows an exemplary backing plate.

FIG. 14 shows an exemplary backing plate.

DETAILED DESCRIPTION

Figure 1:
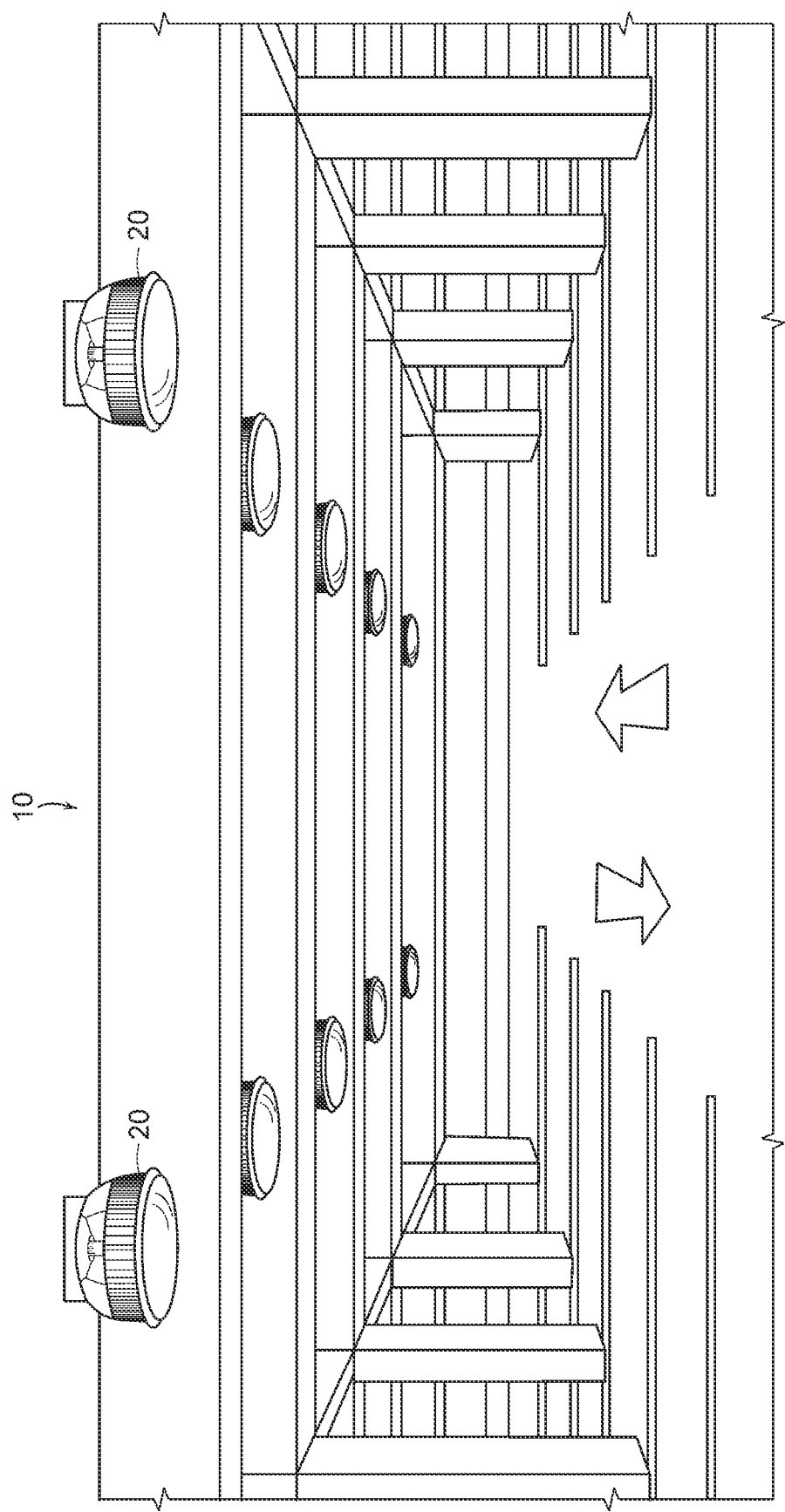
FIG. 1 shows a lighting assembly in a parking garage setting.

FIG. 1 shows a parking garage 10 and a light assembly 20 used to provide light for the parking garage 10. A parking garage 10 (e.g., a parking garage attached to a building or a stand alone parking garage) often includes multiple lighting fixtures that, due to security concerns, often burn 24 hours a day, 7 days a week. Since the lights in the parking garage 10 are illuminated for such lengthy time periods, lighting often represents a majority of the parking garage's utility bill. As such, retrofitting the parking garage 10 with higher efficiency lighting fixtures can result in substantial savings for the parking garage 10.

In addition to the extended use of the lighting in a parking garage setting, lighting used in a parking garage 10 must be able to withstand varying weather conditions. For example, the lighting must perform in wide range of ambient temperatures including temperatures below zero degrees Fahrenheit and as high as 120 degrees Fahrenheit. While traditional fluorescent light sources have been significantly affected by such extreme temperatures, recent advances in fluorescent lamp and ballast technology have allowed fluorescent lamps to strike and run at below zero degrees Fahrenheit with high efficacy. As such, retrofitting a parking garage 10 with higher efficiency lighting fixtures that can withstand the temperature ranges and extended periods of use can result in substantial savings for the parking garage.

Figure 2:
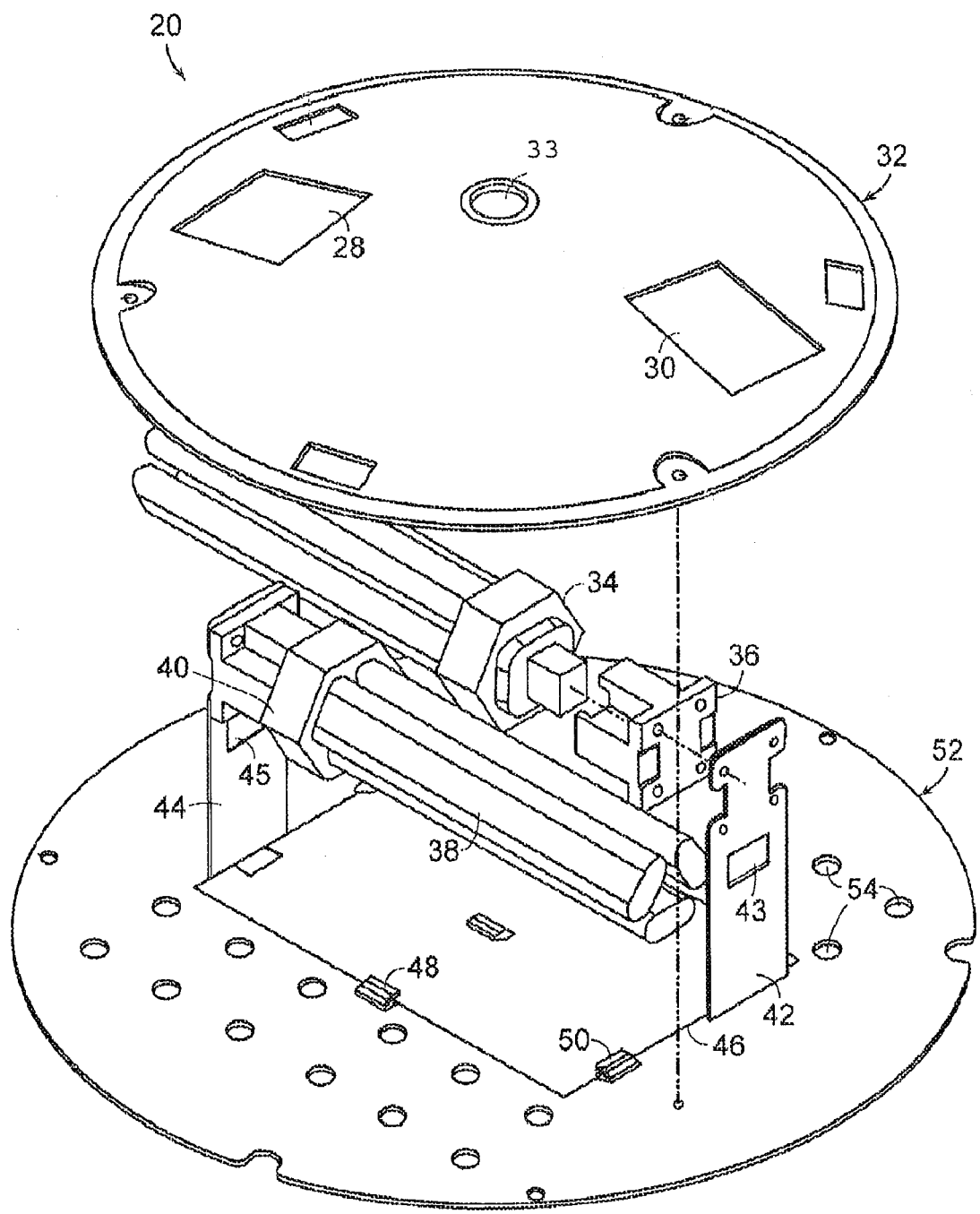
FIG. 2 shows an exploded view of a light assembly.

FIG. 2 shows an exploded view of the lighting assembly 20 for retrofitting an existing light fixture with a higher efficiency assembly including two PL fluorescent lamps, a light reflector and a backing plate. Not shown, but included in the system is a new ballast which powers these new PL lamps. For example, this lighting assembly 20 can mount into an existing high intensity discharge (HID) based low ceiling height fixture (e.g., low bay) The lighting assembly 20 can be used to retrofit a variety of fixture designs with this including low bay fixtures from manufacturers such as Hubbell Kim which has a place of business at 701 Millennium Blvd, Greenville, S.C. 29607, Cooper Lighting which has a place of business at 1121 Highway 74 South, Peachtree City, Ga. 30269, and Genlyte Group LLC which has a place of business at 10350 Ormsby Park Place Suite 601, Louisville, Ky. 40223. In so doing, this common assembly design substantially reduces the operating and maintenance costs while preserving the required illumination levels of these fixtures.

The lighting assembly 20 includes a backing plate 52, lamp holders 42 and 44, lamps 34 and 38, a ballast, and a light reflector 32. The backing plate 52 mounts inside an existing light fixture housing to allow retrofitting of the existing light fixture. The lamps 34 and 38 are connected to the backing plate 52 by lamp sockets 36 and 40 which are attached to the lamp holders 42 and 44 connected to the backing plate 52. Openings 28 and 30 in the light reflector 32 allow the reflector to fit over the lamp holders 42 and 44. The light reflector 32 is formed of a highly reflective material and increases the amount of light directed to the target from the PL lamp. The light reflector 32 is secured to the backing plate 52 by screws or other attachment devices. After installation of the light reflector 32, lamps 34 and 38 are inserted into the lamp sockets 36 and 40 so that a portion of the light emitted by the lamps 34 and 38 is reflected out of the light assembly 20 by the light reflector 32.

Figure 3:
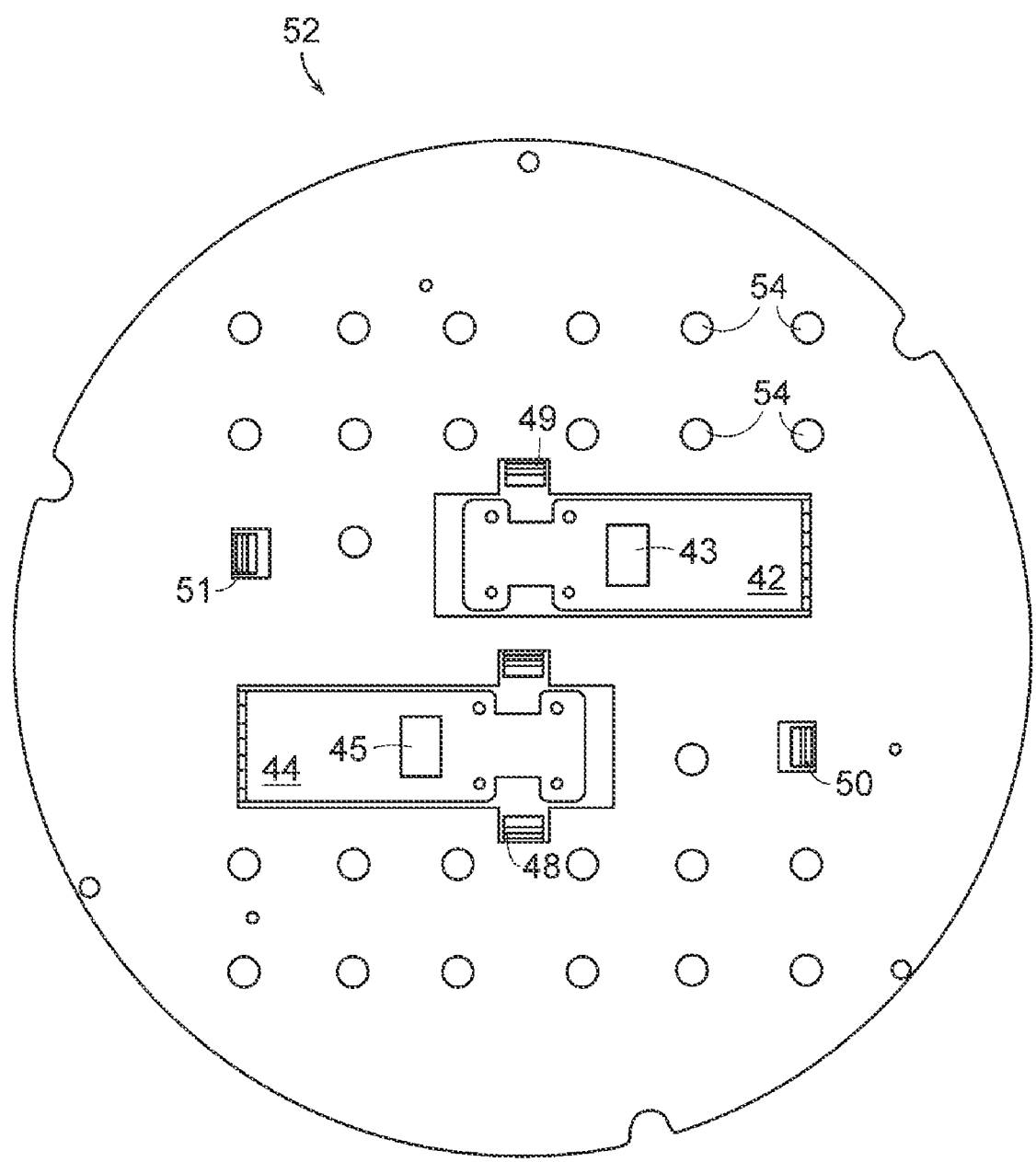
FIG. 3 shows an isometric view of a backing plate.
Figure 5E:
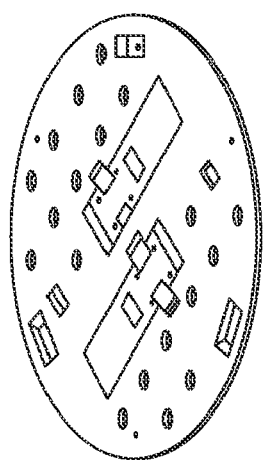
FIG. 5 shows an exemplary backing plate.
Figure 5D:
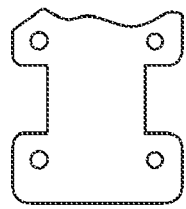
Figure 5C:
Figure 5B:
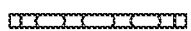
Figure 5A:
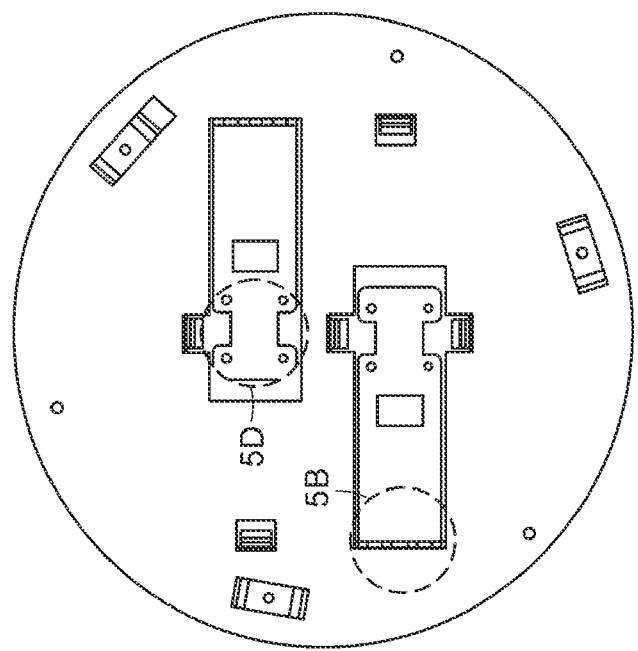

FIG. 3 shows an exemplary backing plate 52. The exterior shape (e.g., the size and shape) of the backing plate 52 can vary to allow the backing plate 52 to fit into an existing fixture's base housing which itself is attached to an electrical connection and roof bracket. The backing plate 52 provides a standardized interior shape that accommodates a common light reflector design so that the same light reflector 32 can be used with multiple backing plates 52 having different exterior shapes. For example, the size and placement of the lamp holders 42 and 44 in the interior portion of the backing plate 52 is the same for backing plates of different sizes and shapes.

The backing plate 52 has an integrated design for lamp holder brackets 42 and 44 which protrude from the interior portion of the backing plate 52. The lamp holder brackets 42 and 44 allow the backing plate and arms to be manufactured from a single piece of metal. During installation the lamp holder arms are bent to about a ninety degree angle with respect to the surface of the backing plate 52. The lamp holder brackets 42 and 44 include openings 43 and 45 through which a high voltage insulation tube can be fed. Lamp sockets 36 and 40 can be attached to the lamp holder brackets 42 and 44 and socket leads from the lamp sockets 36 and 40 can be inserted into the high voltage insulation tube prior to feeding the high voltage insulation tube through the openings 43 and 45.

The backing plate 52 also includes multiple air holes 54 that provide ventilation into the lighting assembly 20. The air holes 54 are openings stamped into the backing plate 52. The air holes 54 allow improved thermal efficiency for the ballast, and reduce the high temperature characteristics of the cavity. In the embodiment shown in FIG. 3, the air holes 54 are small circular openings arranged in a grid-like fashion. However, other arrangements and shapes of the air holes 54 are possible.

The backing plate 52 also includes multiple clips 48, 49, 50 and 51 for attaching an electrical insulation material such as fish paper 46 to the backing plate 52. The fish paper 46 provides a cover between the lamp area and the interior of the fixture housing (e.g., for UL approval).

In some embodiments, the backing plate 52 is produced from a single piece of metal. For example, the backing plate 52 can be stamped from non coated aluminum and the lamp arms 42 and 44 are bent to be perpendicular to the backing plate surface. Lamp sockets 36 and 40 are mounted to the interior lamp arms 42 and 44 on the backing plate 52.

A variety of exterior sizing and shapes for the backing plate 52 are defined for different commercially available fixtures. FIGS. 4 and 5 show two exemplary sizes of the backing plate 52. More particularly, FIG. 4 shows a large backing plate that would be suitable for use with, for example, Cooper fixtures or other similarly sized fixtures. FIG. 5 shows a small backing plate that would be suitable for use with, for example, Hubbell Kim PGL fixtures or other similarly sized fixtures. In general, different backing plates can be similar in shape such that the different sizes of backing plates can be used with the various external dimensions inside different fixture housings.

Figure 6:
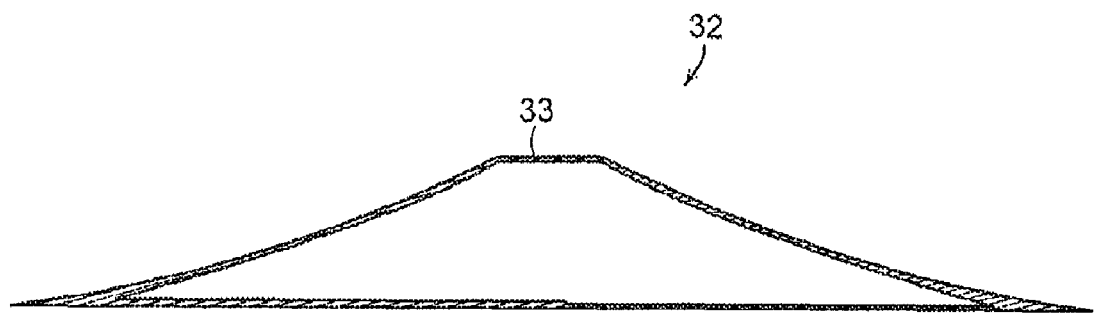
FIG. 6 shows a cross-sectional side view of a light reflector.
Figure 7:
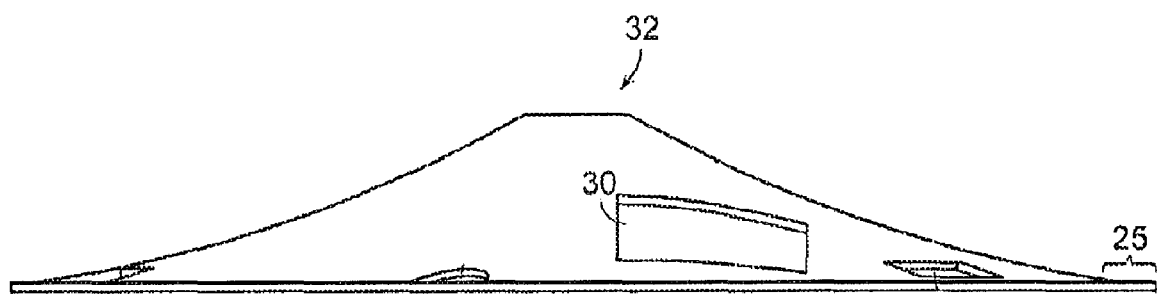
FIG. 7 shows a side view of the reflector of FIG. 6.

FIGS. 6 and 7 show a cross-sectional side view and a side view of the light reflector 32, respectively. The light reflector 32 optimizes light output generated from two cross mounted opposed PL lamps. The light reflector 32 has conical shape which provides optimized reflection and light dispersion from a variety of different wattage PL's, while accounting for their similar form factors and range of lengths. The slope of the light reflector is greater near the center 33 of the reflector and decreases with increased distance from the center 33. The slope decreases with increased distance from the center 33 in order to maximize the fixture efficiency as well as improved dispersion of light, a key element in low bay fixtures. The shape of reflector 32 allows the reflector to perform in a variety of fixtures and especially allowing high angle light to pass thru the clear windows in some models for lighting the ceiling. In addition, the shape of reflector 32 allows for use with a variety of lamp wattages and sizes.

Figure 8:
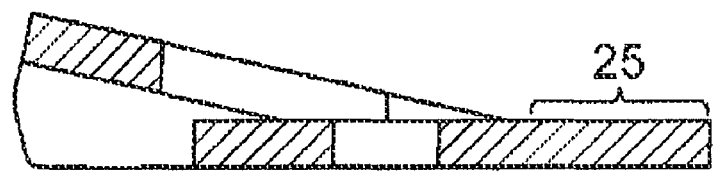
FIG. 8 shows a view of a portion of the light reflector of FIG. 6.
Figure 9:
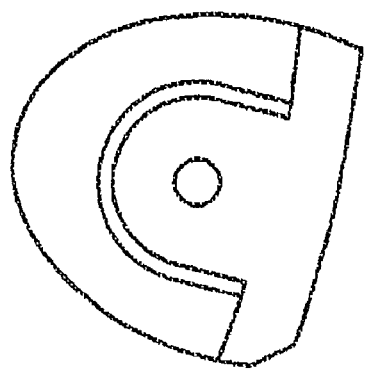
FIG. 9 shows a view of a portion of the light reflector of FIG. 6.

As shown in FIG. 8, the light reflector 32 includes an outer rim 25 that is flat and does not slope. The flat rim 25 allows for easier installation and attachment of the reflector 32 to the backing plate 52. The reflector 32 includes screw holes 24a, 24b, and 24c (FIG. 9 shows an expanded view of a screw hole in the reflector 32) to secure the reflector 32 to the backing plate 52 after the backing plate 52 is inserted into the fixture.

The light reflector 32 also includes rectangular holes 28 and 30 which allow attachment of the reflector 32 after the backing plate 52 has been secured to the fixture housing potentially reducing installation time for the light assembly 20.

The light reflector 32 can be manufactured from a number of metal materials. One exemplary material for manufacture of the reflector 32 is a highly reflective Alanod Mo 4 aluminum material. For example, the reflector 32 can be fabricated from Alanod coated aluminum sheet through a spun metal process.

As described above, the lighting assembly 20 retrofits into existing HID based fixture housings, converting the existing fixture into a more energy-efficient fluorescent PL-based design. The assembly design is cost efficient in that it (i) leverages a common light reflector design which increases the lamp(s) performance (ii) can be installed very quickly utilizing a universal backing plate which accommodates multiple fixture designs and (iii) integrates the lamp holders into the backing plate which allows for a lower cost of manufacturing.

Figure 10:
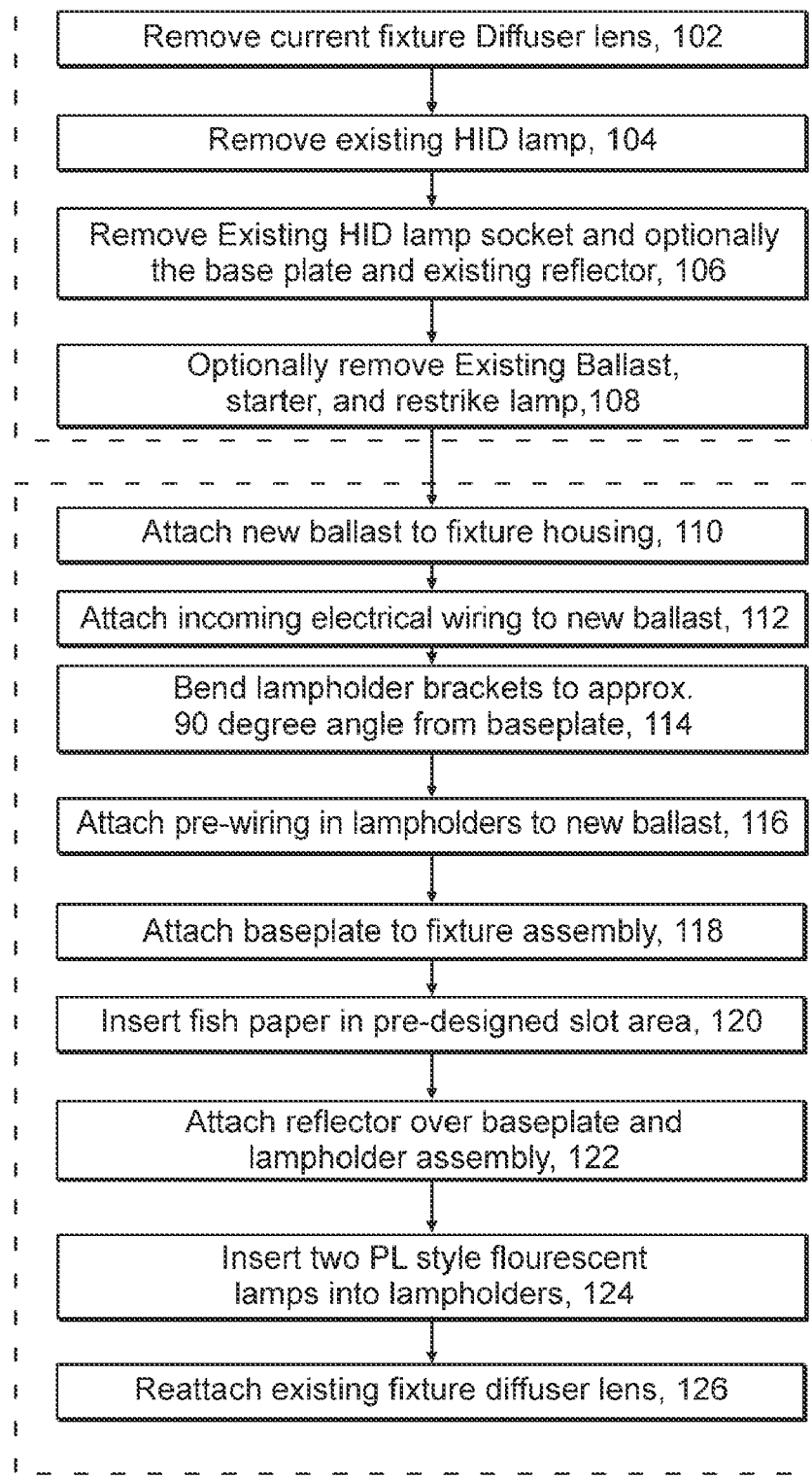
FIG. 10 is a flow chart of a light assembly installation process.

FIG. 10 shows a process 100 for installing the lighting assembly 20. Process 100 includes two main portions; first a portion of the old light fixture is removed including the lamp and subsequently the new light assembly is installed in the existing fixture housing. More particularly, the process for installing the new lighting assembly includes removing the current fixture diffuser lens (102). The process also includes removing the existing HID lamp (104), removing the HID lamp socket, and optionally the base plate and existing reflector (106). The process also includes potentially removing the existing ballast, starter, and restrike lamp (108). After these portions of the existing lamp structure have been removed, the lighting assembly 20 is used to install a new, more efficient light. The process for installing the lighting assembly 20 includes attaching the new ballast to the fixture housing (110) and attaching the incoming electrical wiring to the new ballast (112). The process also includes bending the lampholder brackets to approximately a 90 degree angle from the baseplate (114). After the lampholder brackets are bent into place, the process includes attaching pre-wiring in the lampholders to the new ballast (116) and attaching the baseplate to the fixture assembly (118). The process for installing the lighting assembly 20 also includes inserting fish paper into the pre-designed slot area (120). The process for installing the lighting assembly 20 also includes attaching the light reflector over the baseplate and lampholder assembly (122) and inserting two PL-lamps into lampholders (124). After the lamps have been inserted, the process includes re-attaching the existing fixture diffuser lens (126).

Figure 11:
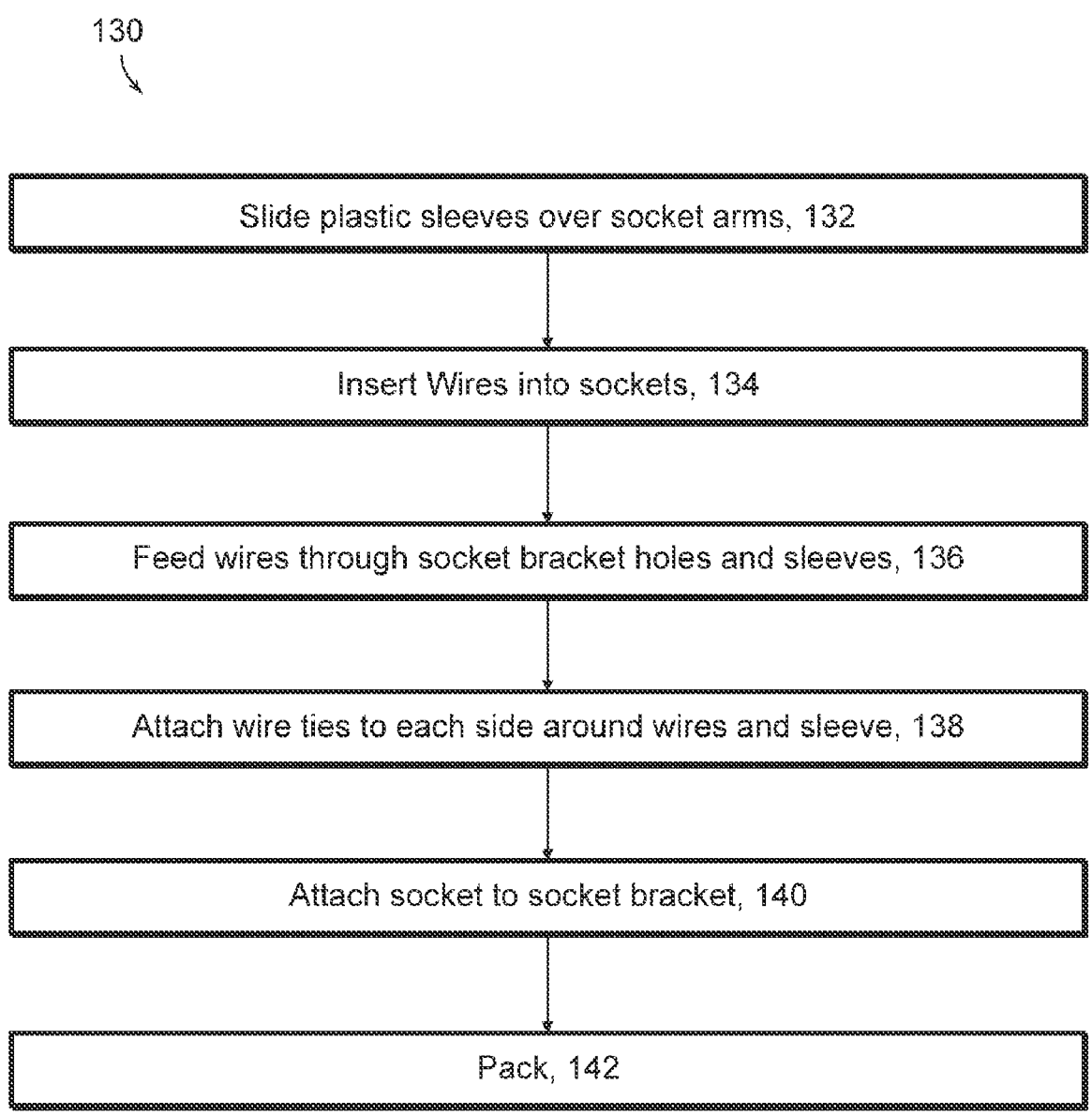
FIG. 11 is a flow chart of a lamp attachment process.

FIG. 11 shows a process 130 for attaching the lamp to the lamp holder. Process 130 includes sliding plastic sleeves over socket arms (132) and inserting wires into the sockets (134). The attachment process 130 also includes feeding the wires through the socket bracket holes and sleeves (136) and attaching wire ties to each side around wires and sleeve (138). After the wires have been fed through the brackets and the wire ties attached, the process includes attaching the socket to the socket bracket (140) and packing the assembly (142).

It is to be understood that the foregoing description is intended to illustrate and not to limit the scope of the invention, which is defined by the scope of the appended claims.

Other embodiments are within the scope of the following claims. For example, while the lighting assembly 20 has been described for retrofitting the HID based lighting fixtures in a parking garage 10, the lighting assembly 20 can also be used to retrofit other HID based lighting fixtures typically used in warehouse, industrial or commercial applications.

Other embodiments can include a specifically designed PL based retrofit assembly that accommodates a variety of HID based outdoor lighting fixtures such as box shaped street lights from manufacturers such as Hubbell, wall washer fixtures, billboard lighting fixtures from various manufacturers and cobra head street light fixtures. The assemblies for these fixtures would include of a different shaped light reflector which was parabolic instead of conical and has a similar integrated backing plate with lamp arms. The design would accommodate multiple fixture sizes and multiple wattage PL lamps depending on the light level performance necessary for the application.

Figure 12B:
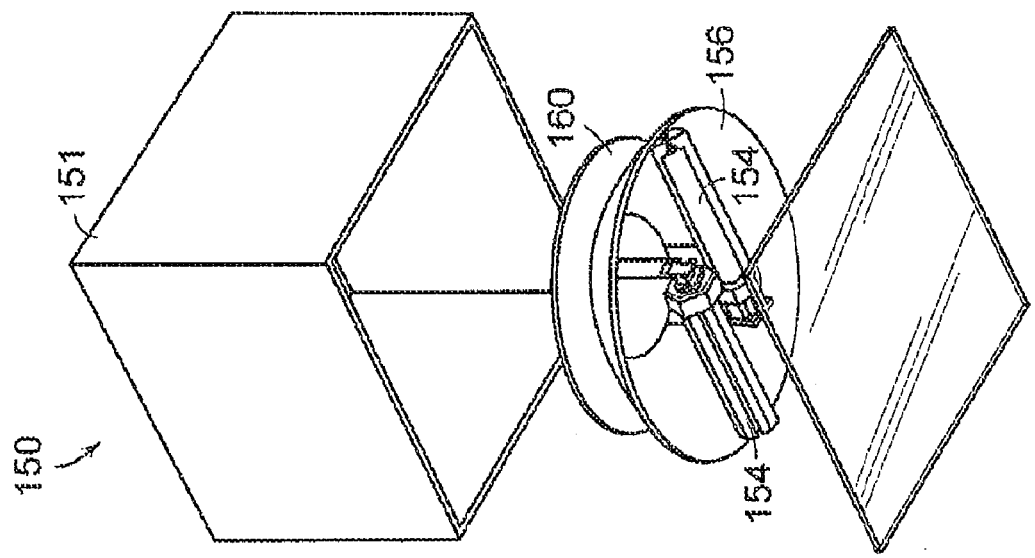
FIGS. 12A and 12B show a shoebox style lighting assembly.
Figure 12A:
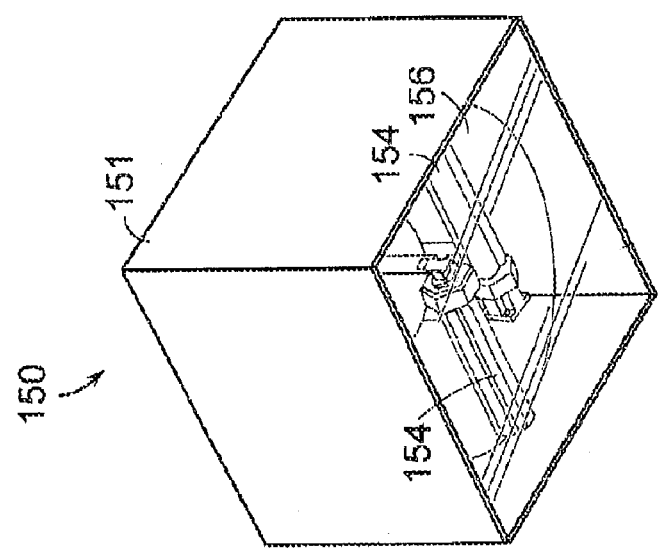

For example, FIGS. 12A and 12B show an exemplary use of a retrofit assembly with a shoebox style light fixture 150. The shoebox style light fixture 150 includes a housing 151 that is substantially box shaped (e.g., rectangular). A retrofit light assembly can be used for retrofitting an existing light fixture with a higher efficiency assembly including two PL lamps 154, a light reflector 156 and a backing plate 160. The exterior shape (e.g., the size and shape) of the backing plate 160 can vary to allow the backing plate 160 to fit into the existing base housing 151 of the shoebox style light fixture 150. In addition, the light reflector 156 can be shaped to optimize light output from the shoebox style light fixture 150. The retrofit light assembly for the shoebox style light fixture would be suitable for use with, for example, Genlyte fixtures, Lithonia fixtures, Hubbell fixtures or other similarly sized fixtures.

Figure 13B:
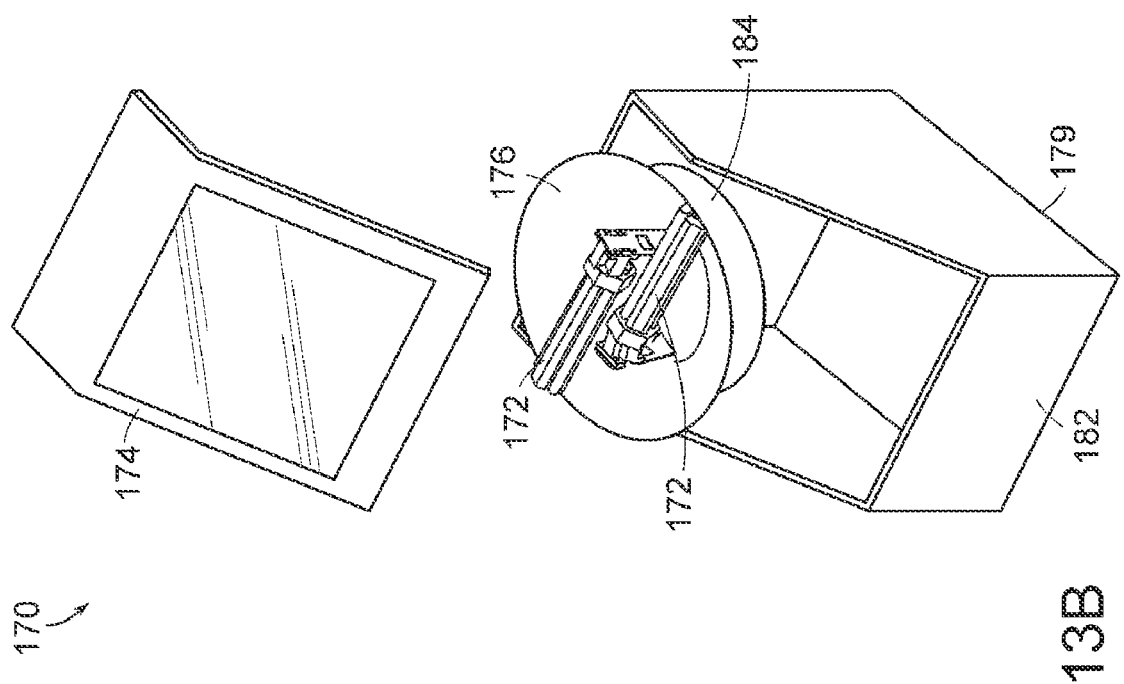
FIGS. 13A and 13B show a sign-light style lighting assembly.
Figure 13A:
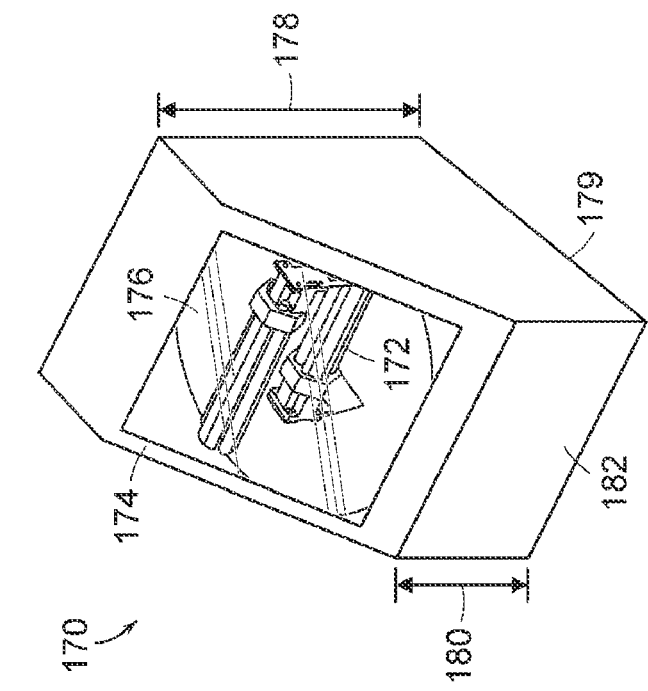

In another example FIGS. 13A and 13B show an exemplary use of a retrofit assembly with a sign-light style light fixture 170. The sign-light style light fixture 170 includes a housing 182 and a cover 174 located on top of the housing 182. The housing 182 is wider at a back end of the housing than at a front end of the housing (e.g., as indicated by heights 178 and 180 respectively) such that the cover 174 is sloped with respect to a bottom surface 179 of the housing 182. A retrofit light assembly can be used for retrofitting an existing sign light fixture with a higher efficiency assembly including two PL lamps 172, a light reflector 176 and a backing plate 184. The exterior shape (e.g., the size and shape) of the backing plate 184 can vary to allow the backing plate 184 to fit into the existing housing 182 of the sign-light style light fixture 170. In addition, the light reflector 176 can be shaped to optimize light output from the sign-light style light fixture 170. The retrofit light assembly for the sign-light style light fixture would be suitable for use with, for example, Cooper fixtures, Hubbell fixtures, Lithonia fixtures or other similarly sized fixtures.

In another example, FIG. 14 shows an exemplary backing plate 200. The exterior shape (e.g., the size and shape) of the backing plate 200 can vary to allow the backing plate 200 to fit into an existing fixture's base housing. The backing plate 200 can be attached to the existing fixture's base housing by inserting screws into apertures 206a, 206b, and/or 206c. Additionally or alternatively, the backing plate 200 includes bendable tabs 208a, 208b, and 208c which can be used to attach the backing plate 200 to the existing fixture's base housing. The tabs 208a, 208b, and 208c can be bent out from the surface of the backing plate 200 to allow mounting of the backing plate 200 to the sides of a reflector or external fixture housing. The backing plate 200 also includes lamp holders 202 and 204 which protrude from the interior portion of the backing plate 200 and multiple air holes 210 that provide ventilation into the lighting assembly. The backing plate 52 also includes multiple clips 212, 214, 216, and 218 for attaching an electrical insulation material such as fish paper 46 to the backing plate 52.

Other embodiments are within the scope of the following claims.

What is claimed is:

1. A lighting retro-fit system for mounting a pin mounted fluorescent lamp within an external housing of a lamp assembly, the pin-mounted fluorescent lamp having pins extending from a base thereof, the retro-fit system comprising:
   a light reflector having an opening;
   an adapter backing plate configured to mount the light reflector within the external housing of the lamp assembly; and
   an arm extending from the adapter backing plate through the opening in the light reflector, the arm having a longitudinal axis; and
   a lamp socket disposed on the arm and extending substantially perpendicular to the longitudinal axis of the arm, the socket configured to receive corresponding pins extending from the base of the pin-mounted fluorescent lamp;
   wherein the reflector is positioned within the external housing and between the lamp sockets and the adapter backing plate.

2. A kit comprising the lighting retro-fit system of claim 1, and a plurality of adapter backing plates having different exterior shapes.

3. A kit comprising the lighting retro-fit system of claim 1, and at least one PL lamp.

4. The lighting retro-fit system of claim 1, further comprising at least one ballast configured to regulate a pin-mounted fluorescent lamp.

5. The lighting retro-fit system of claim 1, wherein the light reflector has a conical shape.

6. The lighting retro-fit system of claim 1, wherein the light reflector has a shape optimized for reflection and light dispersion from different wattage lamps.

7. The lighting retro-fit system of claim 1, wherein the external housing includes a light reflector mount.

8. The lighting retro-fit system of claim 1, wherein the adapter backing plate has a substantially planar surface.

9. The lighting retro-fit system of claim 8, wherein the socket is oriented to hold a lamp along a direction parallel to the planar surface of the adapter backing plate.

10. The lighting retro-fit system of claim 8, wherein the arms extend along a direction perpendicular to the planar surface.

11. The lighting retro-fit system of claim 1, wherein the adapter backing plate surrounds a periphery of the reflector.

12. A parking garage having lamp assemblies retro-fitted by the retro-fit system recited in claim 1.

13. The lighting retro-fit system of claim 1, wherein the light reflector optimizes light output from two cross-mounted opposed PL lamps.

14. The lighting retro-fit system of claim 1, wherein the light reflector has a slope that is greater near a center thereof and that decreases with increasing distance from the center.

15. The lighting retro-fit system of claim 1, wherein the light reflector has a flat outer rim.

16. An apparatus for retro-fitting a lamp assembly to accommodate a pin mounted fluorescent lamp within an external housing thereof, the apparatus comprising:
   an adapter backing plate configured to mount light reflecting means within the external housing of the lamp assembly; and
   lamp support means for supporting the lamp a selected distance from the backing plate;
   means for providing electricity to the lamp, the means for providing electricity being oriented to cause the lamp to extend substantially perpendicular to the lamp support means; and
   light reflecting means disposed between the adapter backing plate and the means for providing electricity to the lamp, the light reflecting means including means for allowing passage of the lamp support means therethrough.

* * * * *

UNITED STATES PATENT AND TRADEMARK OFFICE
CERTIFICATE OF CORRECTION

PATENT NO. : 7,771,083 B2 Page 1 of 1
APPLICATION NO. : 11/873264
DATED : August 10, 2010
INVENTOR(S) : John F. Troller et al.

It is certified that error appears in the above-identified patent and that said Letters Patent is hereby corrected as shown below:

On the title page item (75), third inventor should read: "...Robinson J. Kirby..."

Signed and Sealed this

Fourteenth Day of September, 2010

David J. Kappos
*Director of the United States Patent and Trademark Office*